United States Patent [19]

Montabert

[11] Patent Number: 4,558,763

[45] Date of Patent: Dec. 17, 1985

[54] MUFFLER FOR A PNEUMATIC HAMMER

[75] Inventor: Roger Montabert, Bron, France

[73] Assignee: Montabert S.A., Saint-Priest, France

[21] Appl. No.: 152,034

[22] Filed: May 21, 1980

[30] Foreign Application Priority Data

May 22, 1979 [FR] France ................................ 79 13912

[51] Int. Cl.$^4$ ......................... B23B 45/04; B25D 1/20; B25D 1/22

[52] U.S. Cl. ................................ 181/230; 173/162 H

[58] Field of Search ...................... 173/162 H, DIG. 2; 181/207, 230

[56] References Cited

U.S. PATENT DOCUMENTS

| | | | |
|---|---|---|---|
| 1,644,030 | 10/1927 | Prellwitz | 173/162 H |
| 2,058,583 | 10/1936 | Forss | 173/162 H |
| 2,830,560 | 4/1958 | Doeden | 181/230 X |
| 2,899,934 | 8/1959 | Salengro | 173/162 H X |
| 3,202,239 | 8/1965 | Clarke | 181/230 |
| 3,554,316 | 1/1971 | Judd et al. | 181/230 |
| 3,809,179 | 5/1974 | Delaney, Jr. et al. | 181/230 |
| 3,847,232 | 11/1974 | Klushin et al. | 181/230 X |
| 4,227,591 | 10/1980 | Klaus et al. | 181/230 |

FOREIGN PATENT DOCUMENTS

| | | | |
|---|---|---|---|
| 2349296 | 5/1974 | Fed. Rep. of Germany . | |
| 2282974 | 3/1976 | France | 173/DIG. 2 |

*Primary Examiner*—W. C. Reynolds
*Attorney, Agent, or Firm*—Karl F. Ross; Herbert Dubno

[57] ABSTRACT

A muffler for a pneumatic hammer of the type in which a cylinder receives a piston or ram which is pneumatically driven into contact with an anvil, e.g. the rear end of a tool, and in which the discharge of the air is muffled to limit the noise generated by the apparatus. The air to be discharged into the atmosphere is vented into an annular space between an outer wall of a sleeve or head surrounding the cylinder and connected by an elastic suspension thereto.

10 Claims, 2 Drawing Figures

MUFFLER FOR A PNEUMATIC HAMMER

FIELD OF THE INVENTION

My present invention relates to a pneumatic hammer and, more particularly, to a system for muffling, silencing or diminishing the noise output of a pneumatic tool, especially a pneumatic hammer, of the type in which a ram, piston or the like is linearly reciprocated by compressed air which is vented after each half cycle.

BACKGROUND OF THE INVENTION

Pneumatic percussion tools, such as pneumatic hammers, can comprise a cylindrical body provided with an internal bore in which a ram or piston is linearly reciprocated by the alternate supply of compressed air to chambers formed on opposite sides of the ram. The device is generally provided with a distributing valve system for this purpose and the ram functions as a double-acting piston which, on its forward stroke, is driven into engagement with an anvil or impact-receiving member.

Customarily, the impact-receiving member is a tool mounted in the end of the body of the apparatus and forming a rock-breaking chisel, a drill, a pick or the like. The tool can itself be axially slidable in or relative to the cylinder body.

A handle can be provided at the upper end of the pneumatic apparatus, depending upon the shape of the tool, the power and the stroke. The apparatus may be employed as a chisel for metal work or rock breakage, as a concrete breaker, as a drill or even as a ram for compaction purposes.

Obviously, when compressed air is fed to one of the compartments of the cylinder to drive the ram away from this compartment, the other compartment must be vented. Thermodynamic considerations require that the discharge of air from the compartments during the contraction of the volume thereof be as rapid and as complete as possible to allow for a high kinetic energy of the ram at the point of impact transfer and rapid cycling of the ram movements.

The most simple expedient for controlling the discharge of air is to use the piston at least in part as a valve member. Thus it has been proposed to provide the walls of the cylinder with one or more openings (orifices) which are selectively blocked and unblocked by the ram or piston as it is reciprocated within the cylinder. With proper dimensioning of the orifices, for example, the ram or piston can uncover a large venting cross section to permit the compartment with which this orifice communicates to be contacted rapidly by the extremely rapid discharge of air therefrom. The opening speed for the orifices is similarly rapid.

While such systems have proved to be efficient, the sudden discharge of several cubic decimeters of compressed air at a pressure of several bars, with correspondingly high velocity at practically explosive spontaneity, effected over periods of several thousands of a second and about a thousand times per minute, generates an extremely high noise level which is detrimental to the auditory system of the user or anyone in the vicinity of the operation of the pneumatic hammer.

Because of the natural desire of fabricators of such tools to provide quiet operating devices and the social legal and moral pressures in this direction, considerable effort has been expended in attempting to silence or muffle the discharge of air from pneumatic hammers.

While in most instances, efforts to muffle the discharge of the vented air interfere with the efficiency of operation of the pneumatic hammer, there is a system described in, for example, German patent document (Open Application-Offenlegungsschrift) DE-OS 23 49 296, which has been successfully used in many cases.

This system provides an annular receptacle which surrounds the ram cylinder of the apparatus and defined between an outer wall of the cylinder and an inner wall of an envelope or sheath or shell surrounding same, this receptacle or chamber having a volume sufficient to receive the air discharged from one of the working compartments but at a pressure which is not significantly greater than atmospheric pressure.

The air in this chamber, which can have a pressure significantly lower than 1 bar, can then be released into the atmosphere at a velocity significantly smaller than the velocity with which the chamber is charged, over a period which is the full duration of each stroke of the ram.

While this arrangement represents a major advance in the acoustic muffling of a pneumatic hammer, it does have the serious disadvantage that the efficiency of the discharge depends in large measure on the shape and cross section or area of the conduit through which the previously detained air within the chamber is discharged into the atmosphere.

The cross section of this conduit should be relatively small to permit storage at an elevated pressure albeit close to atmospheric, such that the outflow is practically continuous and not pulsed. The walls of the conduit should be as close together as possible to minimize the sound produced.

The storage of the compressed air, whether from the upper or lower compartment of the cylinder, in a chamber of the type described is always accompanied by a sharp drop in the temperature of the air as a result of the expansion to a lower pressure. Since the final temperature of the detained air is variable and is a function of ambient temperature, it can frequently drop below zero degrees C. as well as below the dewpoint of any moisture in the air.

Condensed or sublimed moisture, transformed into ice, can obstruct the discharge passage and the problem is especially pernicious with smaller cross sections or venting-passage widths.

The art has faced these problems in the past and the only solutions of which I am aware heretofore enlarged the cross section of the conduit by increasing its diameter and thereby increasing the noise evolved which is directly contradictory to the intent of the storage chamber in the first place. Attempts have also been made to use anti-icing systems and combinations of an anti-icing system with an increase in cross section. The prior techniques have all been found to be unsatisfactory and to limit the efficiency of the apparatus or to be uneconomical.

OBJECTS OF THE INVENTION

It is the principal object of the present invention to provide an improved pneumatic hammer whereby the aforementioned disadvantages are obviated.

Another object is to provide a sound-muffling system for a pneumatic hammer which reduces the noise output of the apparatus but nevertheless permits the latter to work with high efficiency.

SUMMARY OF THE INVENTION

These objects and others which will become apparent hereinafter are attained, in accordance with the present invention, by providing a receptacle or shell outwardly of the cylinder and defining a narrow discharge gap at the lower end of this shell between an outer edge thereof and the outer wall of the cylinder, the interior of the shell forming an air-detaining chamber which communicates through the wall of the cylinder with an orifice or bore which is unblocked by the piston or ram to vent the working compartments into this chamber. According to the invention, a sleeve is slidably mounted on the cylinder at the upper end and carries the shell so that the latter slides with the sleeve which is elastically suspended on the cylinder. The reaction forces applied to the cylinder thus impart relative axial reciprocation to the sleeve/shell assembly and the cylinder, thereby assuring that the annular discharge slot defined by the aforementioned edge remains clear of obstruction by movement of this edge along the cylinder wall.

The elastic suspension can be formed by enclosing the upper end of the cylinder and, advantageously, the upper portion of the sleeve, in a head which can carry the manipulating handle for the pneumatic hammer and providing between the sleeve and this head, a coil spring.

Alternatively, a pneumatic suspension cushion can provide the resilient suspension. The freezing phenomenon is thus eliminated as a source of obstruction.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
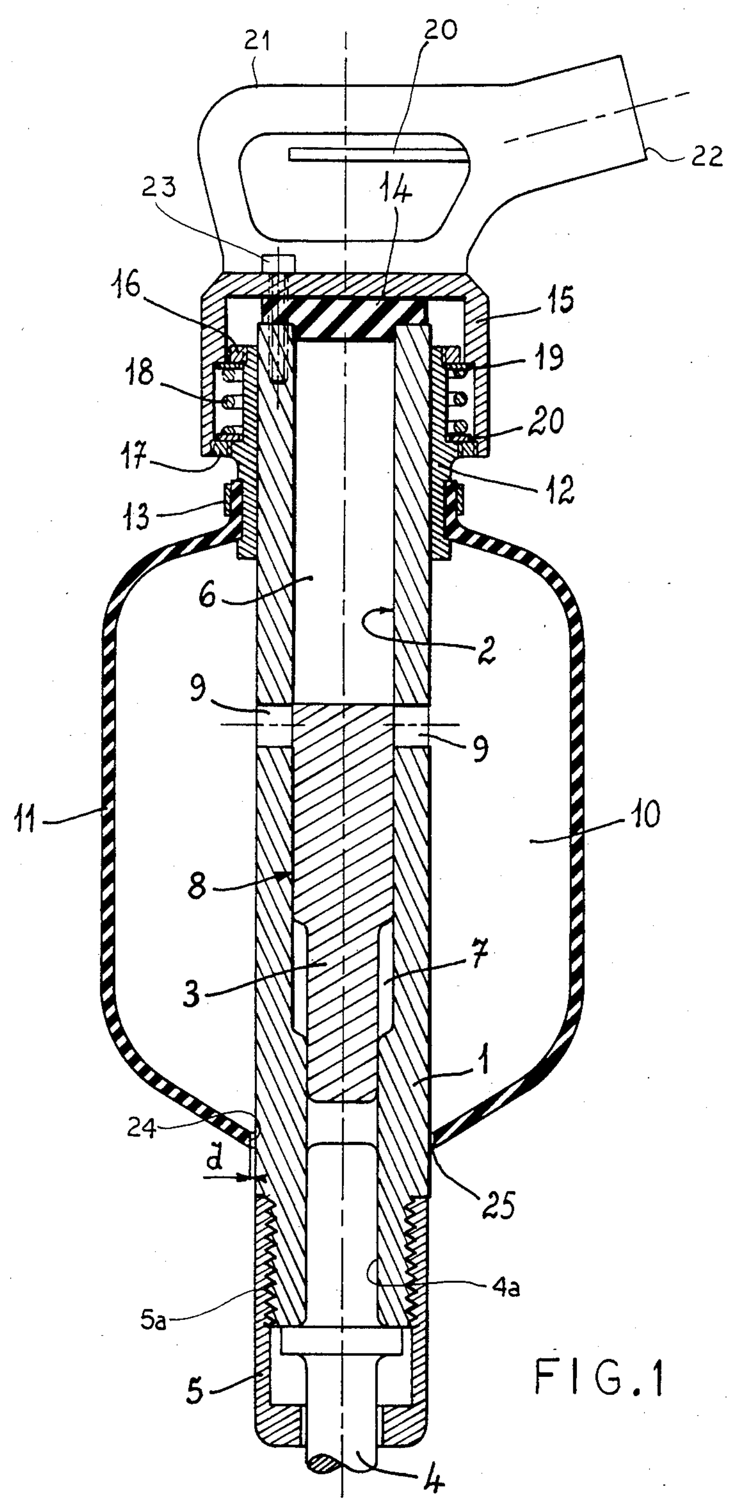
FIG. 1 is a diagrammatic axial cross-sectional view showing the parts of a pneumatic hammer according to the invention with only parts essential to an understanding thereof being shown and the details of the compressed-air distributor, for example, being omitted.

The pneumatic hammer shown in FIG. 1 and provided with an air noise silencer according to the invention, comprises a cylinder body 1 formed with an axial bore 2 which is divided into two working compartments 6 and 7 respectively disposed above and below the piston or ram.

The latter is slidably mounted in the cylinder and can impact against a pick 4, constituting the tool and having a shank **4*a* which is slidably mounted in the lower end of the cylinder bore 2**.

The tool 4 traverses a clamp 5 which closes the lower end of the cylinder and is connected by a screw thread **5*a*** to the cylinder body.

A conventional air distribution system, including a control valve actuated by a trigger 20 and automatic valve feeding compressed air alternately to chambers 6 and 7, has not been shown in the drawing but can be contained in the handle 21 which has a fitting 22 for connecting the distribution system to the compressed air source.

The piston 3 is stepped so that its large diameter section 8 can cover or unblock a pair of diametrically opposite orifices 9 formed radially in the wall of cylinder 1 to vent the air from compartment 6 into a chamber 10 at the end of the downward stroke of the piston 3.

The orifices 9 each are diagrammatically shown and merely represent any radial bores which can be provided to discharge air from the respective chamber and allow reciprocation of the piston (see the German patent publication 23 49 296 previously mentioned which also shows a suitable air-distribution system in some detail).

The chamber 10 is defined between the outer wall of cylinder body 1 and a shell 11 coaxial therewith and has opposite axial ends. The upper end of this shell 11 is fixed to a sleeve 12 which is axially slidable on the upper portion of cylinder body 1. The shell 11 can be composed of an elastomeric material. The shell 11 can be fixed to sleeve 12 by means of a strap or collar 13, defines a chamber 10 with the cylinder body, and the chamber and the shell have opposite axial ends, one of which is the lower end while the other is the upper end.

The upper portion of cylinder 1, covered by a plug 14 which can be elastomeric as well, carries a head 15 in the form of a downwardly open cup receiving the upper end of the cylinder. The head 15, the plug 14 and the cylinder body 1 are connected by bolts, one of which has been shown at 23.

The head 15 carries the handle 21 as previously described.

The juxtaposed parts of the coaxial cup are formed with respective rings 16 (on sleeve 12) and 17 and define an annular space which receives a precompressed coil spring 18 seated against respective annular plates 19 and 20.

The spring 18 thus forms an elastic suspension of a low degree of stiffness, acting in opposite directions and suspending the assembly 11, 12 relative to the cylinder body 1 (via the head 15).

At the lower part, the axial end of the shell 11 has a turned-in portion which is formed with an edge 24 which is juxtaposed with the wall of the cylinder body 1 and defines an annular gap 25 therewith with a small radial thickness d, this gap defining the discharge passage from chamber 10.

During the functioning of the pneumatic hammer (see German patent document 23 49 296), the compressed air is fed to the upper chamber 6 to drive the ram 3 downwardly or to the lower chamber 7 to drive the ram upwardly and the air trapped in the opposite chamber 7 or 6 passes through the orifices 9 and is detained in the annular chamber 10.

This trapped air is discharged into the atmosphere continuously by proper dimensioning of the width d to obtain a maximum attenuation of the noise.

During this operation, the cylinder 1, responding to the alternate reaction forces of the compressed air applied to the piston 3, is displaced relative to the assembly 11, 12 at the frequency of impact. Because of the inertia of the assembly 11, 12 and the movement of cylinder 1 relative to the edge 24, any particles of ice or the like which might block the outlet 25 are rubbed away. This abrasive action is augmented by the elastic deformation of the rubber shell 11 and the movement of the hammer into different positions during use.

Passage 25 remains permanently clear.

Figure 2:
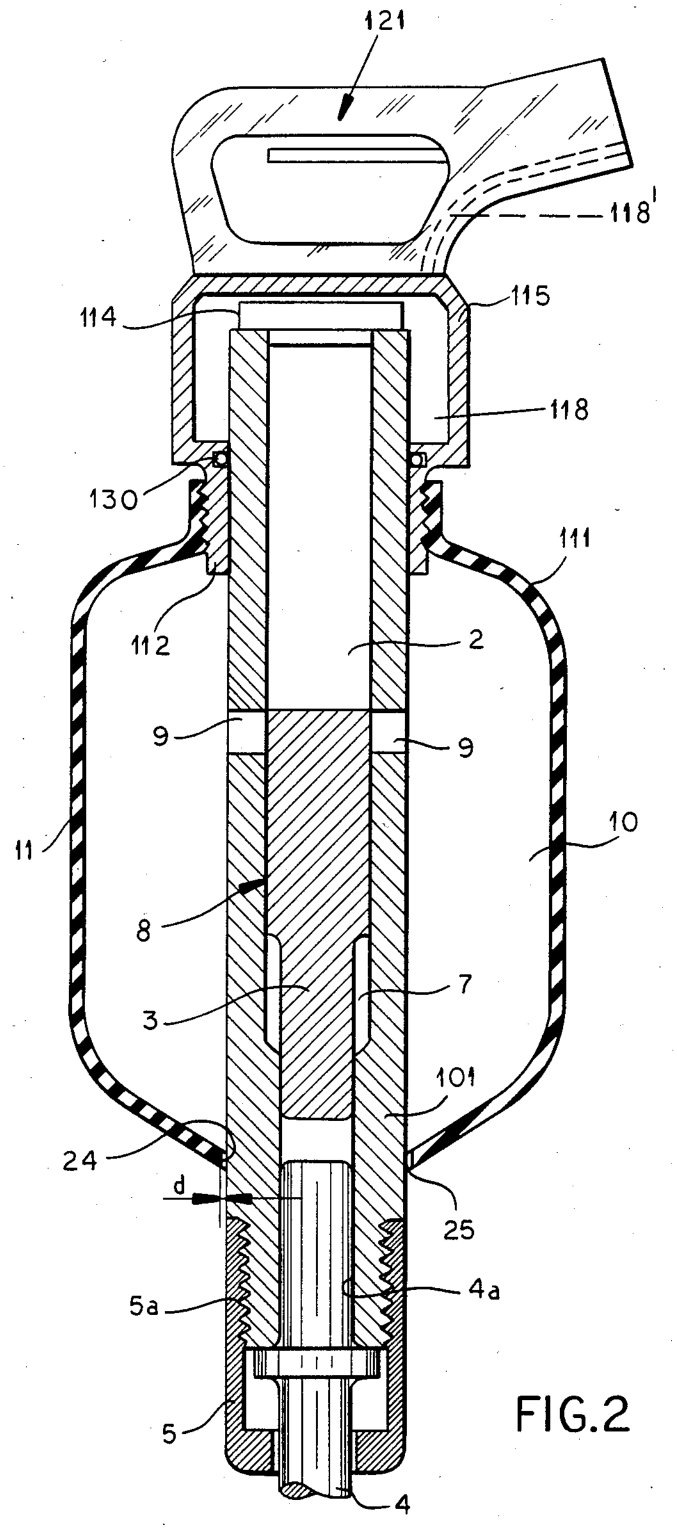
FIG. 2 is another diagrammatic axial cross-sectional view of a pneumatic hammer representing a second embodiment of the invention.

In FIG. 2, where similar reference numerals preceded by a hundreds digit represent similarly functioning parts, the handle 121 is rigid with the sleeve 112 and slides relative to the cylinder body 101 while defining a compartment 118 which is sealed by an O-ring 130 and is connected to the compressed air source by a passage 118. The chamber 118 here forms a pneumatic cushion between the cylinder and the sleeve 112 which allows the assembly of shell 111 and sleeve 112 to slide on the cylinder in the manner described.

Thus FIG. 2 differs from FIG. 1 by replacing the mechanical suspension of the spring of the latter by a pneumatic suspension using the compressed air which is available at the apparatus. Furthermore, in this embodiment the sliding sleeve which is fixed to the envelope is also rigid with the head provided with the handle.

I claim:

1. In a low-noise pneumatic hammer comprising a cylinder body having a ram pneumatically reciprocatable in a cylinder bore thereof and provided with at least one orifice for venting compartments of said bore into an annular storage chamber surrounding said cylinder body and defined between a shell surrounding said cylinder body and the cylinder body itself, the chamber and said shell having opposite axial ends, the improvement which comprises:

an annular edge formed on said shell at one of said axial ends and spacedly juxtaposed with the exterior of said cylinder body to define therewith an annular clearance forming a passage for venting said chamber into the atmosphere, said one of said axial ends of said shell being turned inwardly to approach said body and form said clearance;

a sleeve slidable on said body at said end of said shell opposite said one of said axial ends and connected with said shell whereby said sleeve and said shell form an assembly; and means for elastic suspension between said sleeve and said cylinder body whereby reaction forces on said cylinder body and inertia of said assembly induce relative movement of said edge and said body to maintain said passage clear of obstruction during use of said hammer.

2. The improvement defined in claim 1 wherein said shell is composed of an elastomeric material and is elastically deformable.

3. The improvement defined in claim 1 wherein said elastic suspension includes a spring.

4. In a low-noise pneumatic hammer comprising a cylinder body having a ram pneumatically reciprocatable in a cylinder bore thereof and provided with at least one orifice for venting compartments of said bore into an annular storage chamber surrounding said cylinder body and defined between a shell surrounding said cylinder body and the cylinder body itself, the chamber and said shell having opposite axial ends, the improvement which comprises:

an annular edge formed on said shell at one of said axial ends and spacedly juxtaposed with the exterior of said cylinder body to define therewith an annular clearance forming a passage for venting said chamber into the atmosphere;

a sleeve slidable on said body at said end of said shell opposite said one of said axial ends and connected with said shell whereby said sleeve and said shell form an assembly; and means for an elastic suspension between said sleeve and said cylinder body whereby reaction forces on said cylinder body and inertia of said assembly induce relative movement of said edge and said body to maintain said passage clear of obstruction during use of said hammer, said elastic suspension being formed by an air cushion provided between said sleeve and said body.

5. The improvement defined in claim 4, further comprising a cup-shaped head receiving an end of said body and provided with a handle for manipulating said hammer.

6. The improvement defined in claim 5 wherein said head is fixed to said sleeve and is elastically suspended in said body by said elastic suspension.

7. The improvement defined in claim 5 wherein said head is connected to said body and said elastic suspension is formed between said sleeve and said head.

8. The improvement defined in claim 3, further comprising a cup-shaped head receiving an end of said body and provided with a handle for manipulating said hammer.

9. The improvement defined in claim 8 wherein said head is fixed to said sleeve and is elastically suspended in said body by said elastic suspension.

10. The improvement defined in claim 8 wherein said head is connected to said body and said elastic suspension is formed between said sleeve and said head.

* * * * *